United States Patent
Dietrich et al.

(10) Patent No.: US 12,116,310 B2
(45) Date of Patent: Oct. 15, 2024

(54) PLATE-SHAPED, CHEMICALLY PRESTRESSED GLASS ARTICLES AND METHODS FOR PRODUCING

(71) Applicant: SCHOTT AG, Mainz (DE)

(72) Inventors: Rüdiger Dietrich, Jena (DE); Julia Weißhuhn, Mainz (DE); Jovana Djordjevic-Reiss, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/986,194

(22) Filed: Aug. 5, 2020

(65) Prior Publication Data
US 2021/0039989 A1  Feb. 11, 2021

(30) Foreign Application Priority Data
Aug. 5, 2019 (DE) .............. 10 2019 121 147.6

(51) Int. Cl.
*C03C 21/00* (2006.01)
*C03C 3/083* (2006.01)
(Continued)

(52) U.S. Cl.
CPC ............ *C03C 21/002* (2013.01); *C03C 3/083* (2013.01); *C03C 3/085* (2013.01); *C03C 3/087* (2013.01);
(Continued)

(58) Field of Classification Search
CPC ....... C03C 21/002; C03C 3/083; C03C 3/085; C03C 3/087; C03C 3/091; C03C 3/093;
(Continued)

(56) References Cited

U.S. PATENT DOCUMENTS 3,445,214 A  5/1969 Ormesher
3,523,778 A  8/1970 Robinson
(Continued)

FOREIGN PATENT DOCUMENTS

CN  1896020  1/2007
CN  1962499  5/2007
(Continued)

OTHER PUBLICATIONS

English translation of International Search Report dated Oct. 26, 2020 for PCT/EP2020/071965, 2 pages.
(Continued)

*Primary Examiner* — Maria V Ewald
*Assistant Examiner* — Laura B Figg
(74) *Attorney, Agent, or Firm* — Ruggiero McAllister & McMahon LLC

(57) ABSTRACT

Plate-shaped, chemically prestressed glass articles as well as methods for producing such chemically prestressed glass articles are provided. The glass article has a glass with a composition comprising $SiO_2$, $Al_2O_3$, and $Li_2O$ and a set-drop strength from 50 to 150. The glass has at least one feature selected from: a sodium exchange depth, a storable tensile stress, a network former content of at least 82 wt %, a content of alkali oxides of at most 12 wt %, a content of alkali oxides of at most 10 wt %, and any combinations thereof.

15 Claims, 10 Drawing Sheets

(51) Int. Cl.
    *C03C 3/085* (2006.01)
    *C03C 3/087* (2006.01)
    *C03C 3/091* (2006.01)
    *C03C 3/093* (2006.01)
    *C03C 3/097* (2006.01)
    *C03C 4/18* (2006.01)

(52) U.S. Cl.
    CPC .............. *C03C 3/091* (2013.01); *C03C 3/093* (2013.01); *C03C 3/097* (2013.01); *C03C 4/18* (2013.01); *C03C 2204/00* (2013.01)

(58) Field of Classification Search
    CPC ....... C03C 4/18; C03C 2204/00; C03C 3/097; C03B 17/064
    See application file for complete search history.

(56) References Cited

U.S. PATENT DOCUMENTS

| | | |
|---|---|---|
| 3,684,475 A | 8/1972 | Bondarev |
| 4,055,703 A | 10/1977 | Rinehart |
| 8,075,999 B2 | 12/2011 | Barefoot |
| 8,312,739 B2 | 11/2012 | Lee |
| 8,759,238 B2 | 6/2014 | Chapman |
| 9,359,251 B2 | 6/2016 | Bookbinder |
| 9,487,434 B2 | 11/2016 | Amin |
| 9,517,968 B2 | 12/2016 | Amin |
| 9,540,278 B2 | 1/2017 | Chapman |
| 9,567,254 B2 | 2/2017 | Amin |
| 9,593,042 B2 | 3/2017 | Hu |
| 9,676,663 B2 | 6/2017 | Amin |
| 9,701,569 B2 | 7/2017 | Demartino |
| 9,718,727 B2 | 8/2017 | Bookbinder |
| 9,897,574 B2 | 2/2018 | Andrews |
| 9,902,648 B2 | 2/2018 | Amin |
| 9,908,811 B2 | 3/2018 | Gross |
| 9,908,812 B2 | 3/2018 | Jain |
| 9,977,470 B2 | 5/2018 | Demartino |
| 10,017,417 B2 | 7/2018 | Dejneka |
| 10,180,416 B2 | 1/2019 | Roussev |
| 10,183,887 B2 | 1/2019 | Comte |
| 2002/0023463 A1 | 2/2002 | Siebers |
| 2005/0090377 A1 | 4/2005 | Shelestak |
| 2005/0250639 A1 | 11/2005 | Siebers |
| 2007/0015653 A1 | 1/2007 | Lautenschlaeger |
| 2007/0101765 A1 | 5/2007 | Loeffelbein |
| 2007/0101766 A1 | 5/2007 | Loffelbein |
| 2008/0020919 A1 | 1/2008 | Murata |
| 2010/0028607 A1 | 2/2010 | Lee |
| 2010/0035038 A1 | 2/2010 | Barefoot |
| 2011/0294648 A1 | 12/2011 | Chapman |
| 2012/0052271 A1 | 3/2012 | Gomez |
| 2012/0135852 A1 | 5/2012 | Ellison |
| 2012/0321898 A1 | 12/2012 | Meinhardt |
| 2013/0011542 A1 | 1/2013 | Skalski |
| 2013/0122284 A1 | 5/2013 | Gross |
| 2013/0186140 A1 | 7/2013 | Brix |
| 2013/0189486 A1 | 7/2013 | Wang |
| 2013/0224492 A1 | 8/2013 | Bookbinder |
| 2014/0308525 A1 | 10/2014 | Hochrein |
| 2014/0308526 A1 | 10/2014 | Chapman |
| 2014/0345325 A1 | 11/2014 | Allan |
| 2015/0030840 A1* | 1/2015 | Gomez ................. C03C 3/097 428/220 |
| 2015/0079400 A1 | 3/2015 | Fu |
| 2015/0099124 A1 | 4/2015 | Beunet |
| 2015/0118497 A1 | 4/2015 | Dejneka |
| 2015/0140325 A1 | 5/2015 | Gross |
| 2015/0147575 A1 | 5/2015 | Dejneka |
| 2015/0239775 A1 | 8/2015 | Amin |
| 2015/0239776 A1 | 8/2015 | Amin |
| 2015/0259244 A1 | 9/2015 | Amin |
| 2015/0368148 A1 | 12/2015 | Duffy |
| 2015/0368153 A1 | 12/2015 | Pesansky |
| 2015/0376050 A1 | 12/2015 | Nakamura |
| 2016/0023994 A1 | 1/2016 | Tateno |
| 2016/0102011 A1 | 4/2016 | Hu |
| 2016/0102014 A1 | 4/2016 | Hu |
| 2016/0122239 A1 | 5/2016 | Amin |
| 2016/0122240 A1 | 5/2016 | Oram |
| 2016/0257605 A1 | 9/2016 | Amin |
| 2016/0264452 A1 | 9/2016 | Amin |
| 2016/0338152 A1 | 11/2016 | Lestringant |
| 2016/0347655 A1 | 12/2016 | Meinhardt |
| 2016/0356760 A1 | 12/2016 | Roussev |
| 2017/0022093 A1 | 1/2017 | Demartino |
| 2017/0036952 A1 | 2/2017 | Amin |
| 2017/0107141 A1 | 4/2017 | Miyasaka |
| 2017/0129803 A1 | 5/2017 | Amin |
| 2017/0166478 A1 | 6/2017 | Gross |
| 2017/0197869 A1 | 7/2017 | Beall |
| 2017/0291849 A1 | 10/2017 | Dejneka |
| 2017/0295657 A1 | 10/2017 | Gross |
| 2017/0300088 A1 | 10/2017 | Demartino |
| 2018/0002223 A1 | 1/2018 | Hu |
| 2018/0022638 A1 | 1/2018 | Comte |
| 2018/0029932 A1 | 2/2018 | Hu |
| 2018/0057401 A1 | 3/2018 | Hu |
| 2018/0127302 A1 | 5/2018 | Gross |
| 2018/0230044 A1* | 8/2018 | Ozeki .................. C03C 3/085 |
| 2018/0319706 A1 | 11/2018 | Murayama |
| 2018/0327305 A1 | 11/2018 | Amin |
| 2019/0016632 A1 | 1/2019 | Hu |
| 2019/0127265 A1 | 5/2019 | Dejneka |
| 2019/0152838 A1 | 5/2019 | Gross |
| 2019/0308394 A1 | 10/2019 | Vogl |
| 2019/0308900 A1 | 10/2019 | Vogl |
| 2020/0109083 A1 | 4/2020 | Imakita |
| 2020/0262746 A1 | 8/2020 | He |

FOREIGN PATENT DOCUMENTS

| | | |
|---|---|---|
| CN | 101454252 | 6/2009 |
| CN | 101508523 | 8/2009 |
| CN | 201923942 | 8/2011 |
| CN | 102690059 | 9/2012 |
| CN | 102815860 | 12/2012 |
| CN | 102892723 | 1/2013 |
| CN | 104098269 | 10/2014 |
| CN | 105008293 | 10/2015 |
| CN | 107663032 | 2/2018 |
| CN | 108473369 | 8/2018 |
| CN | 108863050 | 11/2018 |
| DE | 1596590 | 7/1970 |
| DE | 2218274 | 11/1972 |
| DE | 2218275 | 11/1972 |
| DE | 10017701 | 10/2001 |
| DE | 102005053641 | 6/2007 |
| DE | 102006051637 | 5/2008 |
| DE | 102010009584 | 9/2011 |
| DE | 102013203624 | 9/2014 |
| DE | 202014010479 | 10/2015 |
| DE | 102016211065 | 12/2017 |
| DE | 102017124625 | 6/2018 |
| EP | 0850888 | 7/1998 |
| EP | 1593658 | 11/2005 |
| EP | 1682458 | 1/2013 |
| GB | 1129079 | 10/1968 |
| GB | 1158958 | 7/1969 |
| GB | 1381625 | 1/1975 |
| JP | S5234643 | 9/1977 |
| JP | H06227830 | 8/1994 |
| JP | 2004099370 | 4/2004 |
| JP | 2010180076 | 8/2010 |
| JP | 2011157250 | 8/2011 |
| JP | 2016028986 | 3/2016 |
| JP | 2016113341 | 6/2016 |
| JP | 2016183070 | 10/2016 |
| WO | 2005073138 | 8/2005 |
| WO | 2011103798 | 9/2011 |
| WO | 2012126394 | 9/2012 |
| WO | 2013171047 | 11/2013 |
| WO | 2017049028 | 3/2017 |

(56) References Cited

FOREIGN PATENT DOCUMENTS

| WO | 2017087742 | 5/2017 |
|----|------------|--------|
| WO | 2019004124 | 1/2019 |
| WO | 2019054342 | 3/2019 |
| WO | 2019085422 | 5/2019 |

OTHER PUBLICATIONS

English translation of Written Opinion of the International Searching Authority dated Oct. 26, 2020 for PCT/EP2020/071965, 7 pages.
English translation of International Preliminary Report on Patentability dated Feb. 17, 2022 for PCT/EP2020/071965, 9 pages.
DIN EN ISO 14577-1, "Metallic materials—Instrumented indentation test for hardness and materials parameters—Part 1: Test method (ISO 14577-1:2015)", Nov. 2015, 53 pages.
DIN EN ISO 6507-2, "Metallic materials—Vickers hardness test—Part 2: Verification and calibration of testing machines (ISO 65072: 2018)", Jul. 2018, 28 Pages.
English Translation of DIN ISO 6344-2, "Coated abrasives—Grain size analysis Part 2: Determination of grain size distribution of macrogrits P12 to P220 (ISO 6344-2 : 1998)", Apr. 2000, 11 pages.
ISO 4545-1, "Metallic materials—Knoop hardness test—Part 1: Test method", Second Edition, Dec. 2012, 32 pages.
ASTM C158-02, "Standard Test Methods for Strength of Glass by Flexure (Determination of Modulus of Rupture)" ASTM International, May 2007.
Guedes, "Nucleation and crystal growth in commercial LAS compositions", Journal of the European Ceramic Society 21 (2001) pp. 1187-1194.
Venkateswaran, "Crystallisation studies on site saturated lithium aluminosilicate (LAS) glass", Thermochimica Acta, 679 (2019) 178311, 9 pages.
Ovono, "Study of the crystallization kinetics of LAS glass by differential scanning calorimetry, X-ray diffraction, and beam bending viscometry", Thermochimica Acta 527, (2012), pp. 158-164.

* cited by examiner

Sample

PLATE-SHAPED, CHEMICALLY PRESTRESSED GLASS ARTICLES AND METHODS FOR PRODUCING

CROSS REFERENCE TO RELATED APPLICATIONS

This application claims benefit under 35 USC § 119 of German Application No. 10 2019 121 147.6 filed Aug. 5, 2019, the entire contents of which are incorporated herein by reference.

BACKGROUND

1. Field of the Invention

The invention relates to a plate-shaped, chemically prestressed glass article and to a method for the production thereof.

2. Description of Related Art

Chemically prestressable glasses and/or chemically prestressable or chemically prestressed glass articles and/or methods for producing such articles are known.

In this case, chemically prestressable glasses can be differentiated into so-called aluminum silicate glasses (also referred to as AS glasses, alumosilicate glasses, or aluminosilicate glasses), which comprise as components, in particular, $Al_2O_3$ and $SiO_2$ as well as alkali oxides, except for lithium oxide $Li_2O$, as well as lithium aluminum silicate glasses (also referred to as LAS glasses, lithium alumosilicate glasses, or lithium aluminosilicate glasses), which, furthermore, additionally comprise $Li_2O$ as a component.

Plate-shaped glass articles are commonly used as cover panels (so-called cover glasses or protective glasses) in the field of electronic devices, namely, for the protection of mobile devices such as smartphones and/or tablet PCs. Although glass thereby offers the advantage of a very good transparency in the optical spectral range as well as an improved scratch resistance in comparison to transparent plastic, such electronic devices are absolutely exposed in daily use to high wear loads. Moreover, in comparison to transparent plastic, glass is a brittle material, which tends to fracture. In order to improve further the wear resistance of plate-shaped glasses, they are frequently prestressed, whereby, especially in the case of very thin glasses, frequently a chemical prestressing is chosen. In this way, it is possible to improve yet further the wear resistance. Coming into consideration for the protection of mobile devices are thereby only plate-shaped glass articles that are very highly prestressed.

SUMMARY

In the context of the present specification, wear loads are understood to mean loads that can lead to damage to the plate-shaped glass article. Such loads include, for example, abrasive loads, such as rubbing; scratch loads, which, for example, come about through contact with a sharp object, in particular when this object is moved over the surface of the plate-shaped glass article; and impact loads, which, for example, can occur when the plate-shaped glass article drops to the ground.

In the context of the present disclosure, the terms wear resistance and strength, insofar as it is not explicitly stated otherwise, are used largely synonymously as general terms for the resistance of a material or of a product toward mechanical attacks. In the context of the present disclosure, special strengths, such as, for example, the set-drop strength or the bending strength (also: bending tensile strength) are understood as sub-classes of the (overall) strength of a material or product or article.

It has been found that the real loads to which a plate-shaped glass article is exposed are described and can be simulated only inadequately by an isolated consideration of abrasive, scratch, and/or impact loads. Thus, under real conditions, loads can occur in which, for example, an abrasion at a surface with sharp particles is produced, or, for example, an impact load, which is produced when a test body is dropped onto a plate-shaped glass article for the determination of an impact strength, will be comparable only partially, if at all, to the load that actually occurs when an installed plate-shaped glass article drops onto a surface.

It is noteworthy in regard to the strength of a product, such as, for example, a glass article, therefore, that the mechanical strength of a product depends not only on the material, but also, in particular, on the kind of load. Thus, known chemically prestressed glass articles have, for example, a high bending strength, as determined, for example, in a four-point bending test, or a high impact strength, as determined, for example, in a so-called ball drop test ("blunt impact" impact load with round objects), or a high strength in a so-called "sharp impact" (impact load with acute-angled objects). A very important test for mobile devices is, for example, the so-called set-drop test. This test involves an investigation in which loads of glass articles, such as those that can occur in real applications, are studied. For this purpose, a glass article is installed in the form that, for example, it would be installed in a later mobile device such as a smartphone. Accordingly, a model of an end device, such as, for example, the model of a smartphone, is constructed in which the glass article is utilized, for example, as a display cover. The weight of the model thereby largely corresponds to that of an actual end device, as does the installation of the glass article, but without the use of corresponding components. The model, together with the glass article, is then allowed to drop downward onto a surface, which, for example, comprises particles with small radii of curvature. These kinds of test are thus intended to simulate real loads, such as, for example, when a smartphone drops onto asphalt or concrete. It is known here, in general, that rough ground, that is, ground from which small sharp stones or grains of sand protrude, is very critical for the integrity of a protective glass for mobile devices. For example, drop heights differ markedly for the described glass-furnished dummys when they drop onto smooth surfaces—such as granite—or onto rough surfaces with adhering sandpaper, such as a granite surface with adhering sandpaper. Drop heights for rough ground, simulated by granite with adhering sandpaper, are lower than drop heights for a smooth ground surface. Alternative tests, with which such "sharp impact" strengths are investigated, are, for example, so-called "sandpaper ball drop tests." For example, the U.S. patent application US 2015/0239775 A1 describes an exemplary layout of a sandpaper ball drop test.

Glasses, or plate-shaped glass articles that are suitable as protective glasses for mobile devices are designed in such a way that they are prestressable, in particular chemically prestressable. A glass that can be chemically prestressed is understood in the context of the present disclosure to mean a glass that is amenable to an ion exchange process. In such a process, ions of alkali metals are exchanged in a surface layer of a glass, such as, for example, a glass plate. This occurs in such a way that henceforth a zone of compressive stress is built up in the surface layer, this being brought about by the exchange of ions having small radii for ions having larger radii. For this purpose, the glass article is immersed in a so-called ion exchange bath, such as, for example, a molten salt, where the ion exchange bath comprises the ions with the larger ionic radii, in particular potassium ions and/or sodium ions, so that these ions migrate into the surface layer of the glass article. In exchange for them, ions with smaller ionic radii, in particular lithium ions and/or sodium ions, migrate out of the surface layer of the glass article into the ion exchange bath.

In this way, a zone of compressive stress is formed. This compressive stress zone can be described by the characterizing values of the compressive stress, which is also abbreviated as "CS," and the depth of compressive stress, which is also referred to as "depth of layer" or, abbreviated, "DoL." This depth of compressive stress DoL is well known to the person skilled in the art, and, in the context of the present disclosure, refers to the depth at which the stress curve has the stress zero-crossing. Alternatively or additionally, this thickness DoL can be determined by means of an optical zero-crossing stress measurement method, such as, for example, by means of a measuring instrument with the trade name FSM-6000 (which determines only the "hypothetical" K DoL) or SLP 1000 (this instrument determines the "actual" DoL).

It is also possible by means of this measuring instrument to measure the compressive stress of the surface for lithium aluminum silicate glasses and for aluminosilicate glasses as well as the maximum compressive stress CS of a plate or of a plate-shaped glass article. The "hypothetical" Na CS or the Na CS 30, that is, the compressive stress at a depth of 30 μm is determined using the SLP.

The aforementioned lithium aluminum silicate glasses and alumosilicate glasses are known types of glass, which, as a rule, are outstandingly chemically prestressable.

In the context of the present disclosure, alumosilicate glasses are also referred to as "AS glasses." In the context of the present disclosure, lithium alumosilicate glasses are also referred to as "LAS glasses." Other terms for AS glasses are, for example, aluminosilicate glasses or aluminum silicate glasses; in a corresponding way, LAS glasses are also referred to as "lithium aluminosilicate glasses" or "lithium aluminum silicate glasses."

In regard to the compositions of these two types of glass, AS glass and LAS glass, alumosilicate glasses comprise silicon oxide $SiO_2$ and aluminum oxide $Al_2O_3$ as components as well as alkali oxides, except for lithium oxide $Li_2O$, and lithium alumosilicate glasses further comprise, in addition to aluminum oxide and silicon oxide, also lithium oxide $Li_2O$. A distinction between the glasses referred to here as "alumosilicate glasses" and as "lithium alumosilicate glasses" is, therefore, that the lithium alumosilicate glasses comprise $Li_2O$, but the alumosilicate glasses do not. In addition to the aforementioned components, the glass generally comprises yet additional components.

Usually, in the case of highly prestressable glasses (only these come into consideration as, for example, protective glasses for mobile devices for which high requirements are placed on various strength demands), high values for the compressive stress (between 700 MPa and 1000 MPa) are achieved for depths of compressive stress between 40 μm and 200 μm. If an exchange of not only one ion, but also a combined exchange of potassium ions and sodium ions, occurs, which is the case for LAS glasses, the values of CS and DoL, which characterize the compressive stress, are commonly also given with respect to the particular components or ions; that is, for example, the compressive stress resulting from the exchange of potassium is given as "CS potassium" and the corresponding depth of compressive stress is given as "potassium DoL" or potassium compression stress depth.

When it is given in relation to the respective exchanged components or ions, the depth of compressive stress is also referred to as the so-called "exchange depth." In the context of the present disclosure, the terms exchange depth, depth of compressive stress, and DoL are used as synonyms.

However, it is noteworthy here that the terms "potassium DoL" and "sodium DoL" are also in common use. What is involved in the case of the potassium DoL, however, is a value that, in itself, is hypothetical. The sodium DoL and the DoL, in turn, are identical, just as the potassium CS and the CS are identical. For example, what is referred to as the "potassium DoL" or the "potassium exchange depth" is the value that is obtained by extension of the compressive stress curve obtained by the potassium exchange through the point of intersection of the X axis. Therefore, insofar as reference is made to the "potassium DoL," what is involved in the context of the present disclosure is this value, which is to be determined or is determined as described above. but which, in itself is hypothetical. The terms commonly used in the case of prestressed glasses with a combined stress profile are also explained in FIG. 7 on the basis of an exemplary stress profile.

In comparison to the AS glasses, the LAS glasses are advantageous, because it is possible with them to more rapidly achieve greater depths of compressive stress. The depth of compressive stress is thereby given as the value for which the stress curve has the value 0 MPa, that is, is characterized in the stress diagram by the intersection of the stress curve at 0. For LAS glasses, the depth of compressive stress is, as a rule, at least 100 μm or more even for process times of 1 to 3 hours.

Although large depths of compressive stress of up to 125 μm or more, for example, are also possible for AS glasses, it is then necessary in the case of such glasses to choose a very high prestress temperature of 450° C. or more and/or very long prestressing times of 8 hours or more in order to achieve such depths of compressive stress. LAS glasses offer, in contrast, the advantage that high values for the compressive stress and the depth of compressive stress can be achieved under markedly more favorable conditions, that is, at lower temperatures and/or with shorter exchange times.

The measurement technology used for the determination of the values for the compressive stress and the depth of compressive stress involves commercially available instruments, such as, for example, the FSM 6000 instrument for the determination of the compressive stress achieved by the exchange of potassium (potassium CS) and the depth of compressive stress (potassium DoL) as well as, for example, the instrument SLP 1000 for the determination of the characteristic values of the stress achieved by the exchange of sodium, in particular the value of the compressive stress achieved at a depth of 30 μm by sodium exchange (also abbreviated as "Na CS 30") and the depth of compressive stress achieved with sodium (sodium DoL). These instruments are offered by the company Orihara Ltd.

Glass articles that are prestressed in this way make it possible to achieve high mechanical strengths—both bending tensile strengths (for example, the double ring method DIN/EN 1288-5 or DIN EN 61747-5-3) or impact strengths (for example, ball drop strengths).

It is prior art that, besides the classical compressive stress parameters CS and DoL, also the tensile stress is relevant to strength, as can also be taken from the prior art discussed above. It has thereby been found that, for compressive stress integrals that are too high—which have in consequence also correspondingly large tensile stress integrals, because the compressive stress that is introduced into the surface of a glass article and results from a prestressing process is equal in magnitude to the tensile stress that results in the interior of the glass article—the increase in strength stagnates and can even reverse course. This is to be ascribed to the fact that the crack propagation is triggered more strongly or the glass fracture in strength tests, such as, for example, in a four-point bending test or in a test for which the sharp impact strength is being investigated, such as, for example, in a so-called set-drop test, takes place earlier. This is true, in particular, when the DoL is correspondingly small. For the case of roughly equal DoL and a prestress protocol or prestress method that is not combined, that is, is not optimized in regard to the storable tensile stress, however, this is not true. This can also be concluded, for example, from the following table:

| Glass type | TS/d in [MPa] | K CS [MPa] | K DoL [μm] | Na CS 30 [MPa] | DoL [μm] | Set drop #60 [cm] |
|---|---|---|---|---|---|---|
| AS | −35.1 | 410 | 120 | | 120 | 37 |
| LAS | −20.8 | 775 | 7.1 | 155 | 128 | 43 |

Therefore, for optimization of the wear resistance, it has been proposed in the applicant's own application with the number DE 10 2018 124 785 that a plate-shaped, chemically prestressed glass article that combines a high surface compressive stress with a high compressive stress is provided, whereby, however, the stored or storable tensile stress was not maximized, but lies between at least −20.6 MPa and at most −30 MPa, preferably at most −27.5 MPa, especially preferred at most −25 MPa, and most especially preferred at most −24 MPa. The glass article thus has an improved resistance toward sharp impact loads. This high strength results from a storable tensile stress of at least −20.6 MPa. However, in this application of the applicant, it was assumed that the storable tensile stress should not be maximized, because, on the basis of experimental data, it was assumed that even larger values of the storable tensile stress would lead once again to a lower strength toward sharp impact loads. In this way, strengths (mean value) in the set-drop test of 120 cm were obtained. In this case, #180 grit sandpaper was used, which is a relatively fine grit. Although good values were thereby achieved, it has been found that set-drop strengths for a coarser grit, which corresponds to a rougher ground surface, afford markedly poorer results.

It has thus been determined by the present application that there is a need for glass articles that at least alleviate the existing drawbacks of the prior art, in particular also in the case of intensified loads, as when a drop occurs onto a rough ground surface, but still exhibit an adequate wear resistance.

The object of the invention consists in providing plate-shaped glass articles with high wear resistance, in particular for application as protective glasses for mobile devices, as well as in providing a method for producing such glass articles, which at least alleviate the drawbacks of the prior art.

Accordingly, the present disclosure describes, in accordance with a first aspect, a chemically prestressed, plate-shaped glass article with a composition comprising the components $SiO_2$, $Al_2O_3$, and $Li_2O$, which has at least one of the following features: an exchange depth, preferably a sodium exchange depth, of at least 85 μm, preferably at least 100 μm, and especially preferred at least 115 μm for thicknesses of the glass article of at least 0.4 mm up to less than 0.55 mm; of at least 90 μm, preferably at least 120 μm, and especially preferred of at least 125 μm for thicknesses of the glass article of 0.55 mm up to less than 0.6 mm; of at least 100 μm, preferably at least 125 μm, and especially preferred at least 135 μm for thicknesses of the glass article of 0.6 mm up to less than 0.7, of at least 120 μm, preferably at least 140 μm, and especially preferred at least 160 μm for thicknesses of the glass article of 0.7 mm up to less than 1 mm, and of at least 170 μm for a thickness of the glass article of 1 mm up to 3 mm, preferably up to 2 mm, and/or a storable tensile stress of at most −15 MPa and preferably at least −45 MPa, preferably at least −35 MPa, especially preferred at least −30 MPa, and most especially preferred at least −27.5 MPa, and/or a network former content of at least 82 wt % and/or a content of alkali oxides of at most 12 wt %, preferably at most 10 wt %, wherein the plate-shaped glass article is preferably characterized by a set-drop strength, given as drop height in cm, where the drop height is given as a mean value from 15 samples, from 50 to 150 with use of a sandpaper grit of 60. The grit of a sandpaper is oriented to the unit of measurement mesh (#), that is, the number of grains/inch (#60).

The storable tensile stress is understood to mean here, in each case, the integral of the tensile stress from a first main surface to the opposite-lying main surface along a straight line in the direction of the normal line and this integral is divided by the length of the integration and thus the thickness of the substrate, in order to obtain a comparable value for substrates of different thickness. Accordingly, this integral of the tensile stress, which is normalized to the thickness, has the dimension of a stress and supplies comparable values for substrates of different thickness. Such a design has a number of advantages.

The chemically prestressed, plate-shaped glass article with a composition comprising the components $SiO_2$, $Al_2O_3$, and $Li_2O$ is consequently formed as a glass article made of a LAS glass. It was already discussed that such glass articles that are formed from a so-called LAS glass have advantages in regard to the prestressability; that is, they are more favorable to processing and can also achieve very good mechanical strengths thereby.

BRIEF DESCRIPTION OF THE DRAWINGS

DESCRIPTION OF THE DRAWINGS

Figure 1:
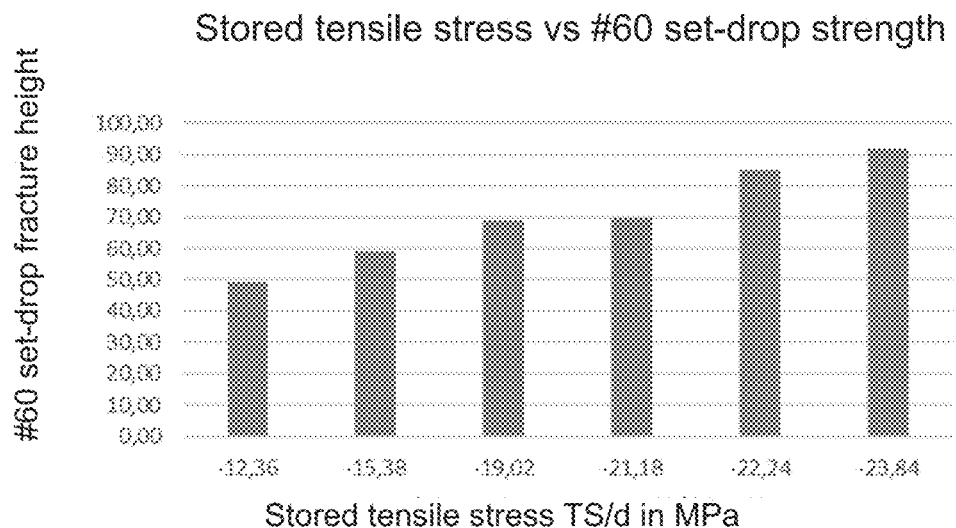
Figure 2:
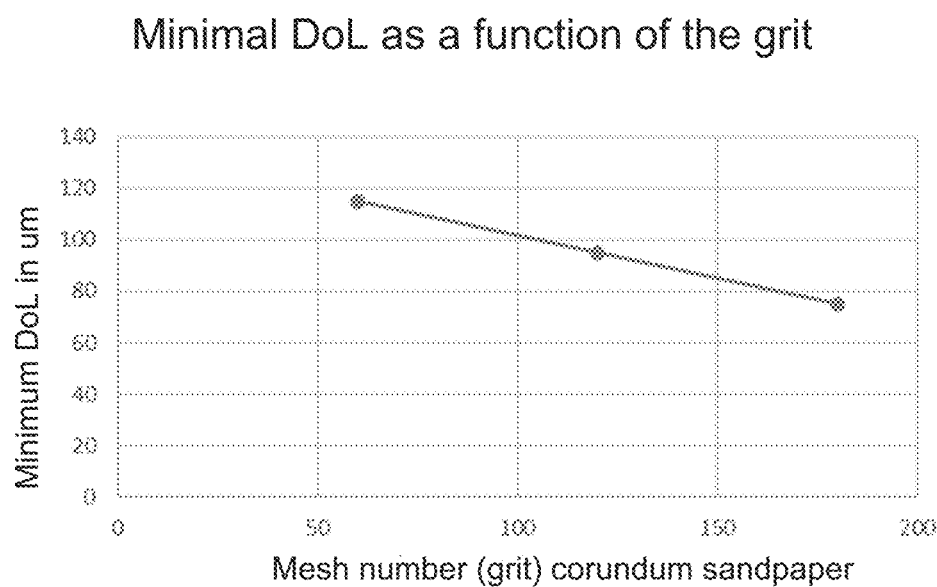
Figure 5:
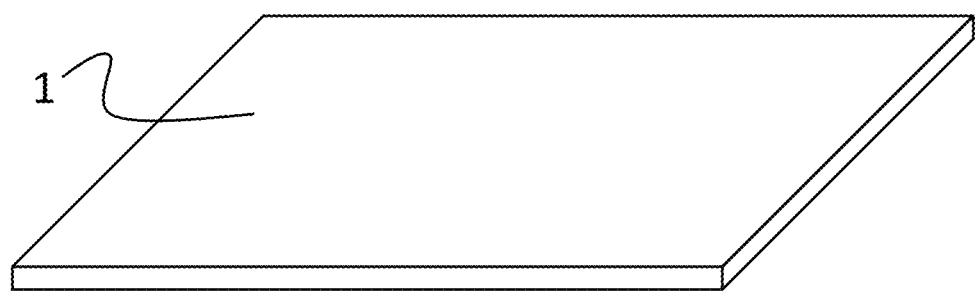
Figure 6:
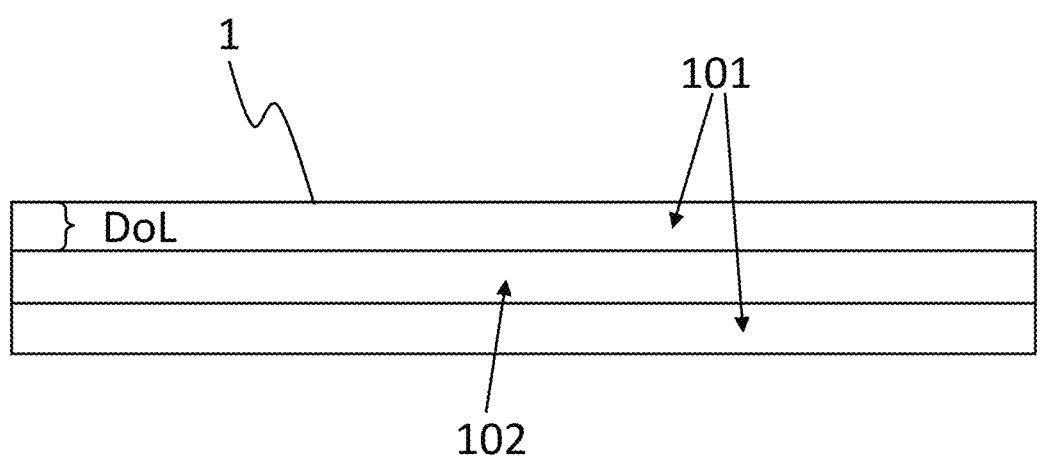
Figure 7:
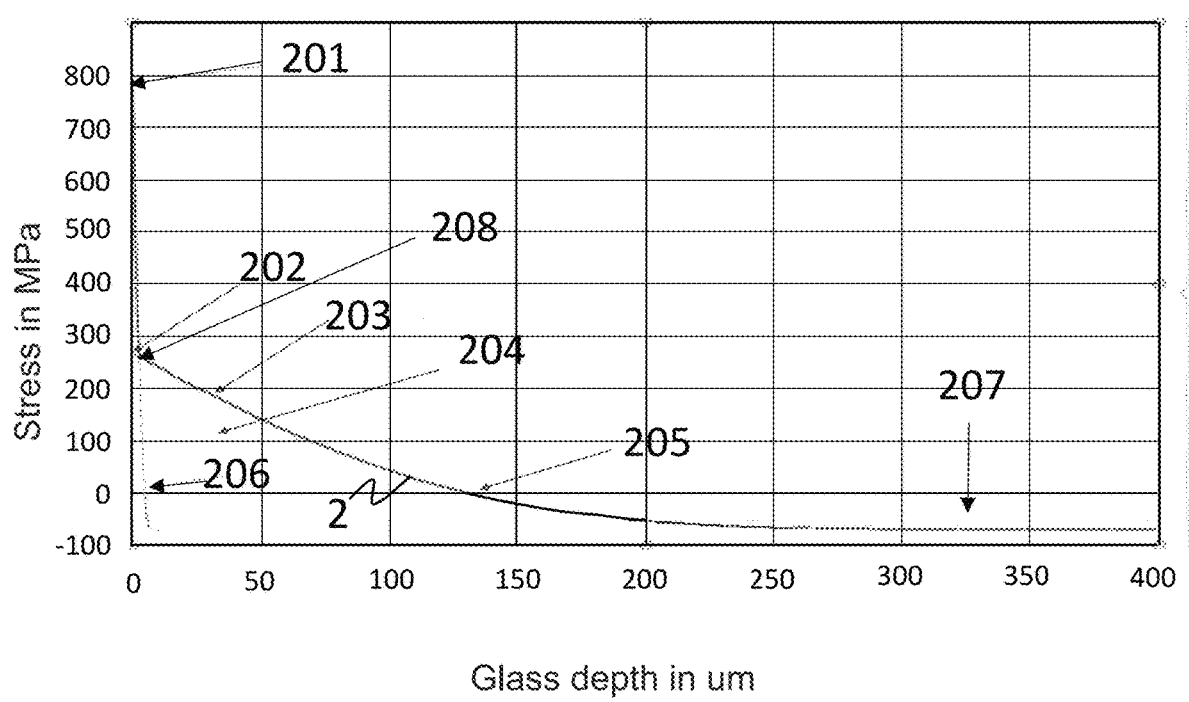
Figure 8:
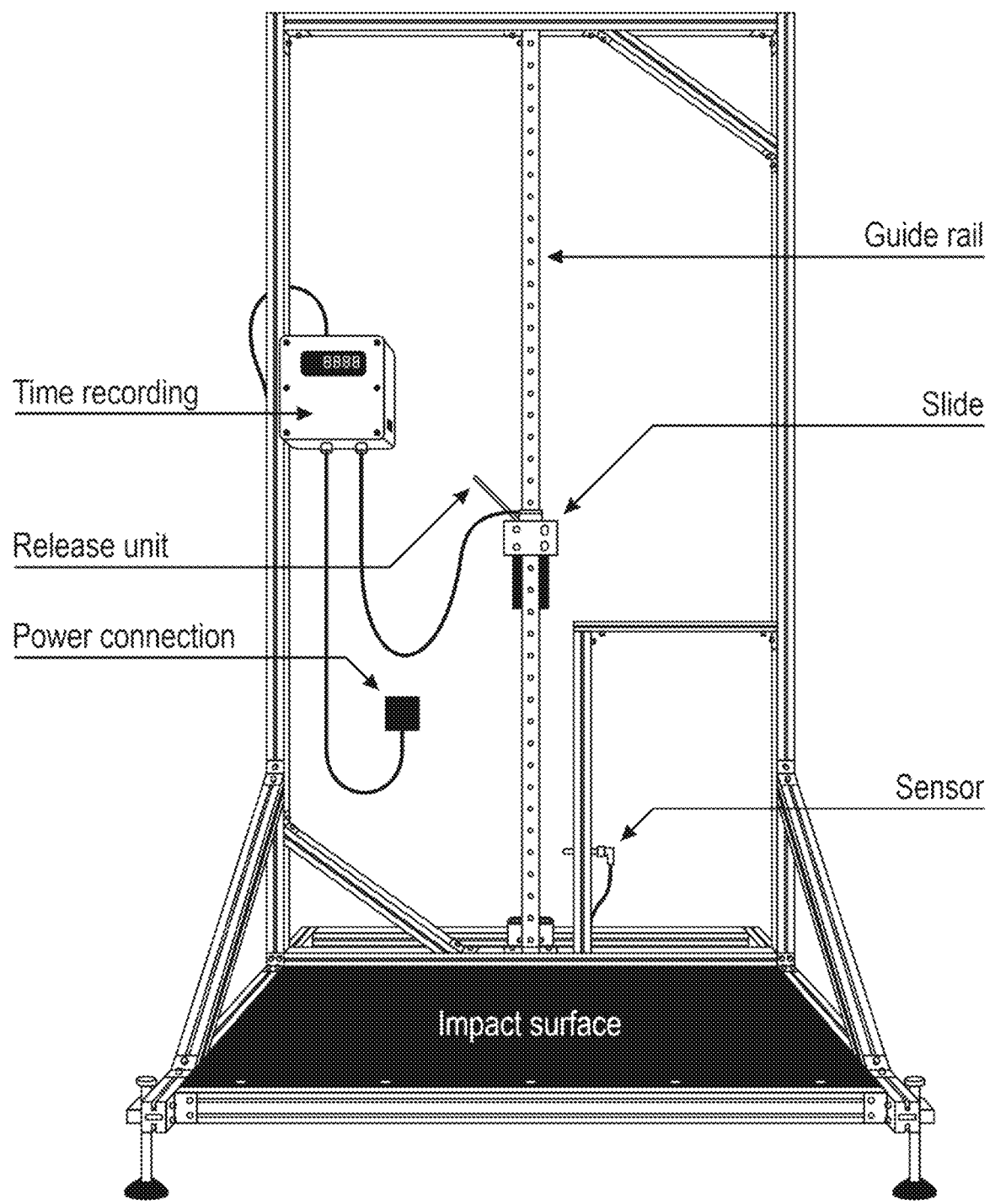
Figure 9A:
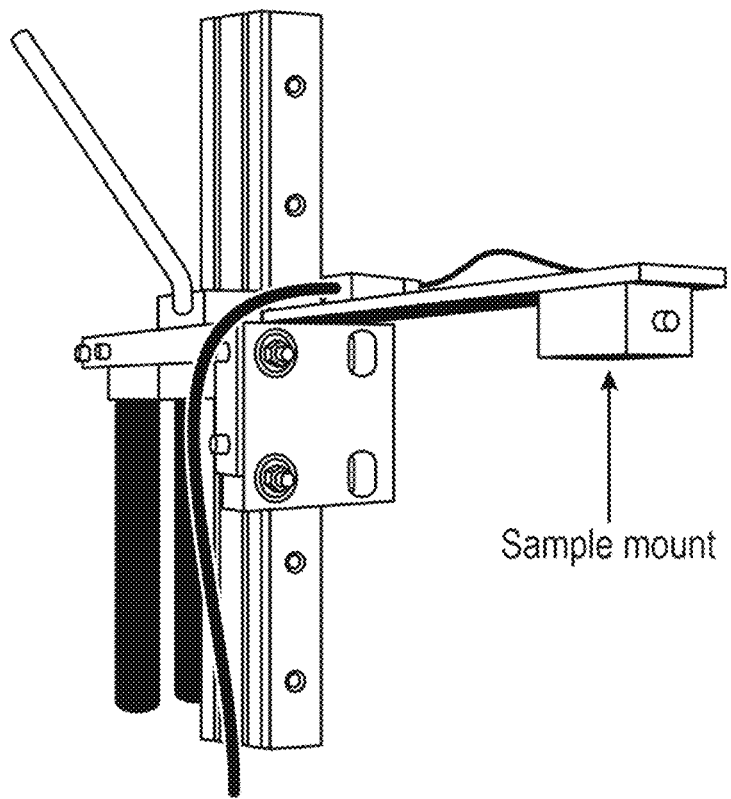
Figure 9B:
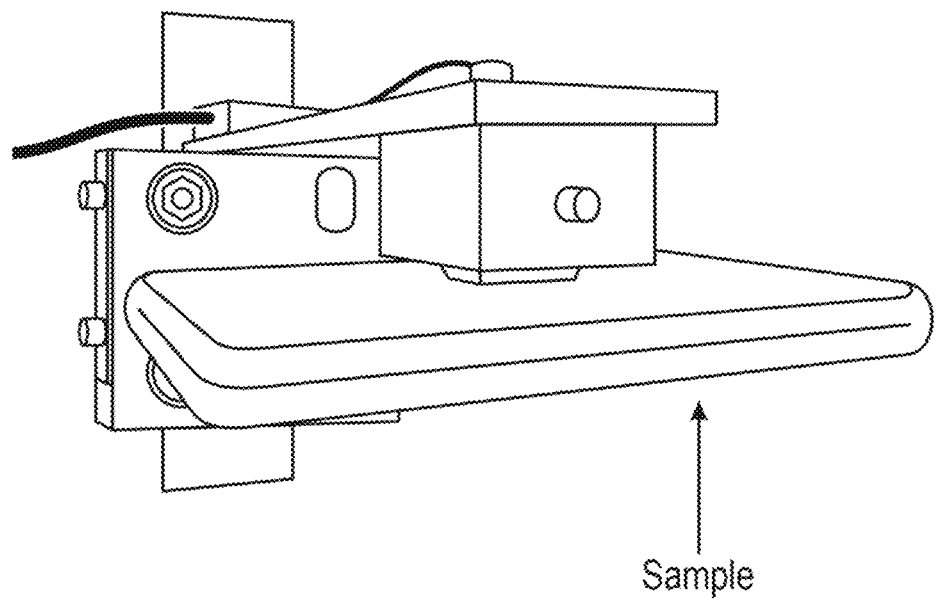
Figure 10:
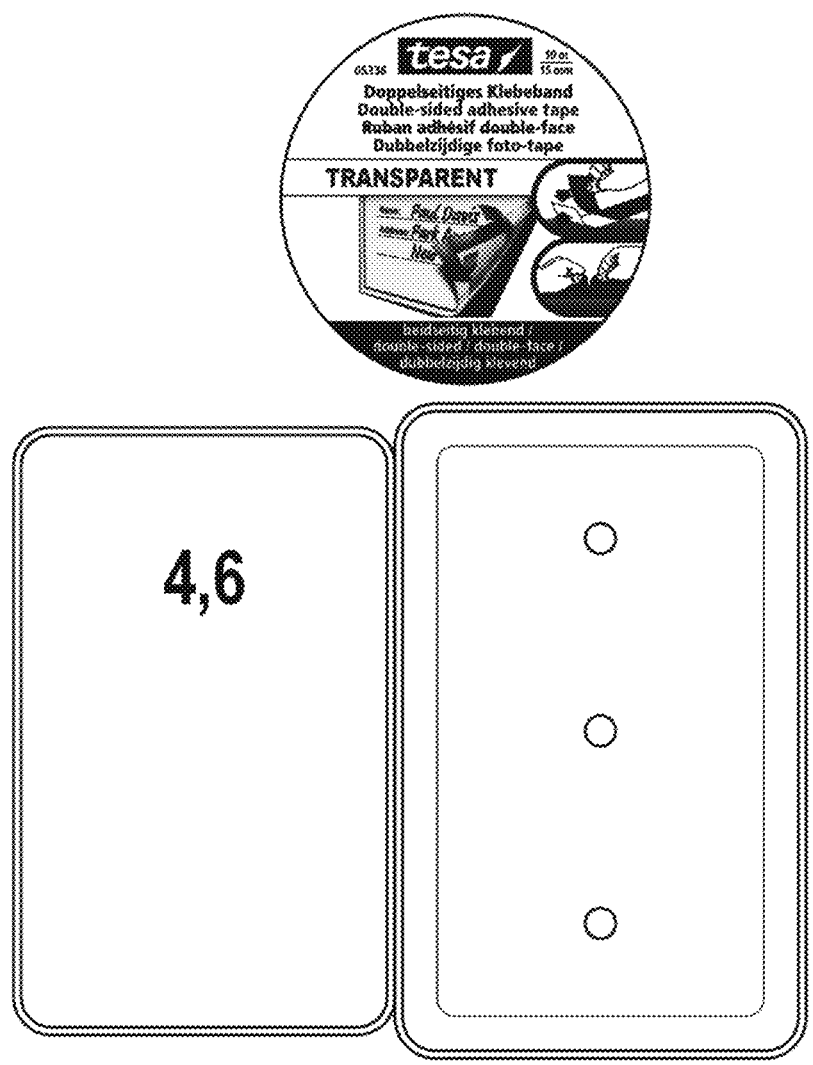
Figure 11:
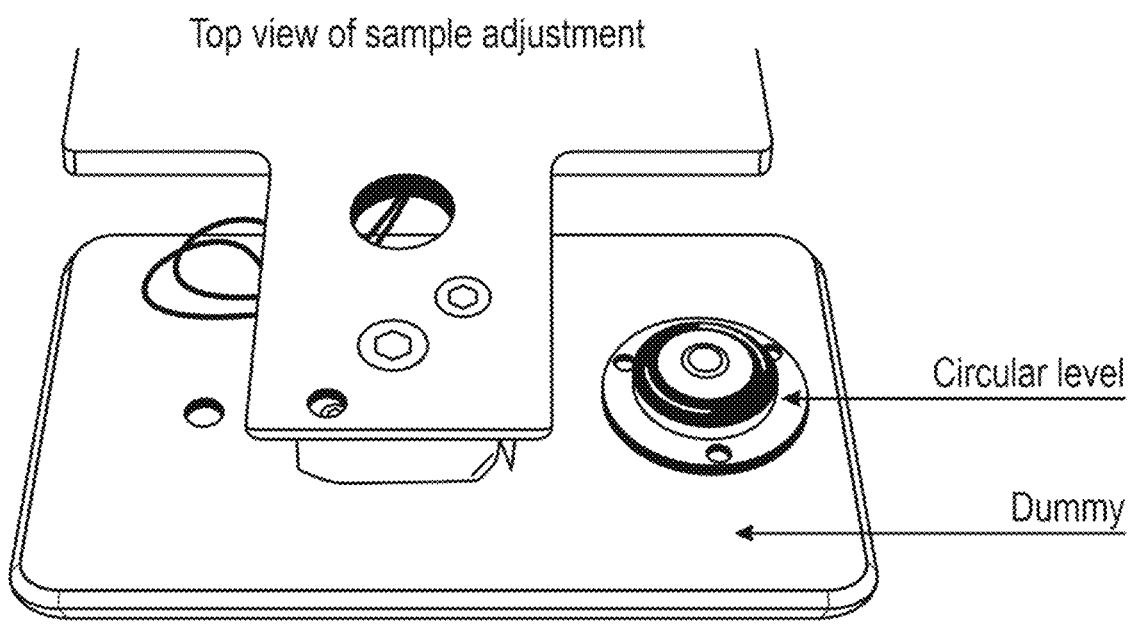

The invention will be explained in detail below on the basis of drawings. Shown are:

FIG. 1 the relation between the stored tensile stress and the set-drop strengths for grit 60 (#60);

FIG. 2 shows the minimum DoL as a function of the grit used in the set-drop test;

FIGS. 3*a*-3*c* and 4*a*-4*c* show fracture patterns of glass articles as a function of the stored tensile stress for two different glasses;

FIG. 5 a schematic and not dimensionally accurate illustration of a glass article in accordance with embodiments of this disclosure;

FIG. 6 shows a schematic and not dimensionally accurate sectional image through a glass article in accordance with embodiments of this disclosure;

FIG. 7 is an exemplary stress profile of a glass article;

FIG. 8 is an overall view of the set-drop-test apparatus with labelling of the individual components;

FIGS. 9a and 9b show the sample mount and the release mechanism of the set-drop test apparatus;

FIG. 10 shows the aluminum housing as the sample mount and the plastic plate as the sample dummy; and FIG. 11 shows the alignment of the sample dummy in the sample mount by means of 2D water balance.

DETAILED DESCRIPTION

By use of the plate-shaped glass article in accordance with the present specification, however, further advantages are realized in comparison to the chemically prestressed, plate-shaped glass articles of the prior art. In particular, it has been found that the chemically prestressed, plate-shaped glass article has a further increased strength toward so-called "sharp impact loads," such as, for example, in a set-drop test. It has thereby been found that especially good values, that is, high values, for the set-drop strength are obtained for an exchange depth, preferably a sodium exchange depth, of at least 85 μm, preferably at least 100 μm, and especially preferred at least 115 μm for thicknesses of the glass article of at least 0.4 mm up to less than 0.55 mm; of at least 90 μm, preferably at least 120 μm, and especially preferred at least 125 μm for thicknesses of the glass article of 0.55 mm up to less than 0.6 mm; of at least 100 μm, preferably at least 125 μm, and especially preferred at least 135 μm for thicknesses of the glass article of 0.6 mm up to less than 0.7; of at least 120 μm, preferably at least 140 μm, and especially preferred at least 160 μm for thicknesses of the glass article of 0.7 mm up to less than 1 mm; and of at least 170 μm for a thickness of the glass article of 1 mm up to 3 mm, preferably up to 2 mm; and/or a storable tensile stress of at most −15 MPa, and preferably at least −45 MPa, preferably at least −35 MPa, especially preferred at least −30 MPa, and most especially preferred of at least −27.5 MPa.

The tensile stress is furnished, as a rule, with a negative sign and compressive stresses are furnished, in contrast, with a positive sign, because compression and tension have correspondingly opposite directions. Insofar as, in the context of the present disclosure, reference is made to the value of a tensile stress, without a sign being thereby mentioned, it is understood that what is thereby involved is the magnitude of the stress. What is involved here is the definition of the sign of the stress as it is conventionally used by the person skilled in the art, that is, the developer of prestressed protective glasses, in regard to the sign of the stress. This departs especially from the usual reference to the compressive stress as negative and the tensile stress as positive, such as, for example, as conventionally assumed in physics. In the context of the present disclosure, however, recourse is made here, as discussed, to the definition of stresses as conventionally used in the glass industry.

The work with different grits, that is, for example, with sandpapers in the grits #60 to #180, has revealed that the connection described in the application of the applicant with the number DE 10 2018 124 785 between the stored tensile stress and the set-drop strength is linked to the condition of a minimum DoL. This is motivated due to the different grits of the respective sandpapers. It was already noted that, in particular, rough and acute-angled surfaces are especially hazardous for protective glasses or cover glasses. Acute-angled penetrating hits or the stress field produced by them, depending on the size thereof, can result in penetration through the DoL and advance into the zone of tensile stress and can thereby cause a glass fracture. In this respect, the minimally required DoL increases, starting from which the relation between a larger stored tensile stress and a higher set-drop strength holds true, with the grit of the sandpaper used in the set-drop test. The larger the acute-angled grain or the stone, the larger is this minimum DoL. This relation is manifested in an especially impressive manner by the AS glasses that have a simple ion exchange profile. Thus, for a standard prestress protocol for which a DoL of 50 μm and a compressive prestress of 926 MPa are achieved, these glasses have a stored tensile stress of −33.07 MPa for the thickness 0.7 mm. On the basis of the small DoL, however, this stored tensile stress is not manifested by a good #60 set-drop strength and the glasses already fail for minimum heights of 25 cm.

The stored tensile stress is determined with a variation of approximately 5% to 10% around the determined value.

For reasons of simplicity, the calculation of the tensile stress integral is performed under the assumption of a linear course of the compressive stress profile. For an alumosilicate glass, therefore, this is obtained by the following formula:

$$CS*DoL/2*1000*d,$$

where CS is understood to mean the maximum compressive stress at the surface of the glass article, DoL is the depth of compressive stress, and d is the thickness of the glass article.

For a LAS glass with a combined compressive stress profile, the calculation is somewhat more complicated and is performed using the following formula: [K CS*K DoL/2*1000+Na CS point of intersection*((Na DoL−K DoL)+(Na DoL−K DoL point of intersection))/2*1000]/d.

Here, too, d refers to the thickness of the glass article. The "sodium CS point of intersection" describes the compressive stress at the point of the compressive stress profile at which the sodium compressive stress curve and the potassium compressive stress curve intersect. The "potassium DoL point of intersection" is understood to mean the depth in the glass article at the point of the compressive stress profile at which the sodium compressive stress curve and the potassium compressive stress curve intersect.

As can be seen from the above discussion, the stored tensile stress, as defined above, is thus a thickness-correlated value, that is, the tensile stress in relation to the thickness, so that the unit of the stored tensile stress is MPa.

It has further been found that such plate-shaped, chemically prestressed glass articles can also be described alternatively as comprising a network former content of at least 82 wt % and/or a content of alkali oxides of at most 12 wt %, preferably at most 10 wt %.

A high content of network formers of at least 82 wt % is advantageous, because, in this way, a stable, three-dimensionally cross-linked network is obtained. It has been found that, in this way, a good prestressability of such a glass is also afforded; that is, such a glass with a content of network formers of at least 82 wt % is rigid enough to be able to store stress, in particular tensile stresses, in the bulk volume, without a marked relaxation thereby resulting and the wear resistance of the glass or of the glass article thereby decreasing, for example, over the course of time.

Alternatively or additionally, the glass of the glass article can comprise a content of alkali oxides of at most 12 wt %, preferably at most 10 wt %. It has been found that, in this way, surprisingly good strength values can be achieved after the chemical prestressing. This is all the more surprising in that, during chemical prestressing, especially alkali ions are exchanged, so that it has hitherto been assumed that a high content of alkali oxides is necessary in order to be able to achieve a good prestressing. The prestressing, which is accomplished by the ion exchange, is, namely, all the greater the more small ions are exchanged for large ions.

Such a design of the plate-shaped glass article consequently enables very high set-drop strengths to be achieved. Although the absolute drop heights that are achieved are comparable to those of already known glasses or glass articles, they were obtained when the drop occurs onto a ground surface with a 180 grit. What is involved here is a relatively fine grit. A critical drop occurs when a ground surface with larger, coarser grains is present, since, on account of their size and the high energy per grain, they can penetrate deeper into the glass article owing to the smaller number of grains per cm$^2$ and therefore are more likely to lead to a failure. Drop heights onto such rough ground surfaces, such as, for example, those obtained by way of sandpaper with a 60 grit, were therefore markedly less for the known plate-shaped, chemically prestressed glass articles than for the glass articles in accordance with the present disclosure. In the context of the test apparatus used, set-drop values for #60 should be smaller by roughly a factor of 3.5 to 4 than the values obtained for grit #180.

In this case, the set-drop test is preferably carried out as follows:

A glass plate is fixed in place on a sample mount and allowed to drop from cumulatating drop heights onto a defined ground surface. An overview of the overall structure is illustrated in FIG. 8 The glass article used in the set-drop test has a length of 99 mm and a width of 59 mm and, as illustrated in FIGS. 9*a* and 9*b*, is fixed in place magnetically with a sample dummy in the sample mount. First of all, a plastic plate is adhesively attached by use of double-sided adhesive tape in a metal housing, which has the shape and weight of a holder for a mobile device, such as, for example, a smartphone. Suitable for this are, for example, plastic plates with thicknesses between 4.35 mm and up to 4.6 mm (see FIG. 10). The adhesive attachment occurs preferably by means of double-sided adhesive tape with a thickness of about 100 μm. The plate-shaped glass article that is to be tested is then adhesively attached to the plastic plate by means of double-sided adhesive tape, preferably a piece of double-sided adhesive tape with a thickness of 295 μm, in particular a double-sided adhesive tape of the trade name tesa®, Product Number 05338, in such a way that, between the top edge of the housing or the holder and the top edge of the glass article, a distance of between 350 μm and 450 μm is obtained. The glass article lies higher than the frame of the housing and there should be no direct contact between the glass body and the aluminum housing. The "set" that is thus obtained has a weight of 177.5 g and models the installation of a glass article in a mobile device and is a kind of "dummy" for a real mobile device—here, in particular, a smartphone—is subsequently allowed to drop downward onto an area of size DIN A4, the so-called impact surface, with the glass side at an initial speed of zero in the vertical direction and thus in the drop direction. The impact surface is produced here as follows: sandpaper with a corresponding grit, such as, for example, the grit 60 (#60), is adhesively attached to a bottom plate by means of a piece of double-sided adhesive tape, such as, for example, an adhesive tape with a thickness of 100 μm. Utilized as adhesive tape was tesa (10 m/15 mm), transparent, double-sided, Product Number 05338. The grit is defined in the context of the present disclosure in accordance with the standards of the Federation of European Producers of Abrasives (FEPA). For examples, see also DIN ISO 6344, in particular DIN ISO 6344-2:2000-04, "Schleifmittel auf Unterlagen—Korngrößenanalyse—Teil 2: Bestimmung der Korngrößenverteilung der Makrokörnungen [Abrasive agents on substrates—Grain size analysis—Part 2: Determination of the grain size distribution of the macroparticles] P 12 to P 220 (ISO 6344-2:1998)". The weight of the bottom plate, which is an aluminum substrate in the case of the presently disclosed values, amounts to approximately 3 kg.

The bottom plate must be secure and is preferably formed from aluminum or also, alternatively, from steel. The sandpaper has to be furnished completely with adhesive tape and has to be attached adhesively in a bubble-free manner. The impact surface may only be used for ten tests and needs to be replaced after the tenth test. The sample, that is, the set that is obtained, is inserted in the test apparatus and is aligned by means of a 2D-water balance (circular level) in such a way that the set is situated horizontally, whereby the plate-shaped glass article is pointed toward the ground, that is, in the direction of the impact surface (see FIG. 11). The first drop height is 25 cm; the drop then occurs from a height of 30 cm. Insofar as no break has yet occurred, the drop height is increased in 10-cm steps until the glass breaks. The break height, the break origin, and the break pattern are noted. The test is carried out on 15 samples and a mean value is calculated.

It may be advantageous to fix in place the plate-shaped glass article on the plastic plate in such a way that, in the case of a glass break, the plate-shaped glass article remains adhesively attached to a sheet so as to remove it with as little difficulty as possible, but, on the other hand, also so as to enable an investigation of the glass article. For this purpose, it may be advisable, in addition to the adhesive tapes used, to arrange a self-adhesive sheet between the plastic plate and the plate-shaped glass article. By means of this sheet, it is then possible to remove the broken plate-shaped glass article.

In the context of the present disclosure, the following definitions are applicable:

An exchange bath is understood to mean a salt melt that is employed in an ion exchange method for a glass or for a glass article. In the context of the present disclosure, the terms exchange bath and ion exchange bath are used synonymously.

As a rule, salts of technical-grade purity are used for exchange baths. This means that, in spite of the use of solely sodium nitrate, for example, as starting material for an exchange bath, certain contaminants are still present in the exchange bath. The exchange bath here is a melt of a salt, such as, for example, sodium nitrate, or a melt of a mixture of salts, such as, for example, a mixture of a sodium salt and a potassium salt. The composition of the exchange bath is thereby present in the form that relates to the nominal composition of the exchange bath without taking into consideration possibly present contaminants. Therefore, in the context of the present disclosure, insofar as a 100% sodium nitrate melt is addressed, this therefore means that, as raw material, only sodium nitrate was used. However, the actual content of sodium nitrate in the exchange bath can deviate from this and, as a rule, does so, because, in particular, technical raw materials have a certain proportion of contaminants. However, as a rule, these contaminants constitute less than 5 wt % in relation to the total weight of the exchange bath, in particular less than 1 wt %.

In a corresponding way, in the case of exchange baths that have a mixture of different salts, the nominal contents of these salts are presented without taking into consideration the contaminants of the starting materials due to the technical grade. An exchange bath containing 90 wt % KNO$_3$ and 10 wt % NaNO$_3$ can therefore also still have small amounts of contaminants, which, however, are due to the raw materials and, as a rule, should constitute less than 5 wt % in relation to the total weight of the exchange bath, in particular less than 1 wt %.

Furthermore, the composition of the exchange bath also changes in the course of the ion exchange, because, owing to the ongoing ion exchange, particularly lithium ions migrate out of the glass or out of the glass article into the exchange bath. Such a change in the composition of the exchange bath due to aging is also not taken into consideration in the present case, however, as long as it is not explicitly stated otherwise. Instead, in the context of the present disclosure, the nominal original composition is taken into account in stating the composition of an exchange bath.

A stress profile is understood in the context of the present disclosure to mean the plot in a diagram of the stress in a glass article, such as, for example, in a glass plate, versus the thickness of the glass in question. Insofar as, in the context of the present disclosure, a compressive stress profile is addressed, this is understood here to mean the part of a stress profile in which the stress takes on positive values, that is, is greater than zero. In contrast, tensile stress has a negative sign.

A combined compressive stress profile is understood in the context of the present disclosure to mean a compressive stress profile for which the compressive stress in the corresponding article, such as a glass article, is combined from at least two subregions.

The compressive stress stored in a prestressed glass article is obtained by integration of the compressive stress over the thickness of the glass article. In the context of the present disclosure, this integral is referred to as the compressive stress integral.

The tensile stress stored in a prestressed glass article is obtained by the integration of the tensile stress over the thickness of the glass article. In the context of the present disclosure, this integral is referred to as the tensile stress integral. In the context of the present disclosure, the stored tensile stress is consequently understood to mean a normalized tensile stress or synonymously as a normalized tensile stress integral, that is, a tensile stress integral related to the thickness. In the context of the present disclosure, the stored tensile stress is synonymous with the terms normalized (or thickness-related) tensile stress and normalized (or thickness-related) tensile stress integral.

A plate-shaped glass article is understood in the context of the present disclosure to mean a glass article for which the lateral dimension in one spatial direction is at least an order of magnitude less than that in the other two spatial directions, whereby these spatial directions are given with respect to a Cartesian coordinate system, in which these spatial directions extend perpendicular to one another and the thickness in the direction of the normal line to the largest or main surface is thereby measured from the one main surface to the other main surface.

Because the thickness is at least an order of magnitude less than the width and length of the glass article, the width and length can thereby be of the same order of magnitude. However, it is also possible that the length is once again markedly greater than the width of the glass article. In the sense of the present disclosure, plate-shaped glass articles can therefore comprise a glass ribbon.

In the sense of the present disclosure, a glass is understood to mean a material and a glass article is understood to mean a product that is produced from the glass material and/or the product comprising the glass material. In particular, a glass article can be composed of glass or predominantly contain the glass material, that is, up to at least 50 wt %. Therefore, insofar as, in the context of the present disclosure, a glass article with a composition is described, it is therefore understood that the glass article comprises a glass of such a composition or is predominantly composed of a glass of such a composition, that is, is composed of this material or this glass at least up to 50 wt %, or essentially is composed of this material or this glass, that is, up to at least 90 wt %, or comprises it.

A chemical prestressing in the context of the present disclosure is understood to mean a process in which a glass article is immersed in a so-called exchange bath, resulting in an exchange of ions. A potassium exchange is understood in the sense of the present disclosure to mean that potassium ions migrate out of the exchange bath into the glass article, in particular into the surface of the glass article; that is, for example, they are incorporated into the surface of the glass article, whereby, at the same time, small alkali ions, such as, for example, sodium ions, migrate out of the glass article into the exchange bath. A sodium exchange is understood in a corresponding way to mean that sodium ions migrate out of the exchange bath into the surface of the glass article, whereas small ions, such as, for example, lithium ions, migrate out of the glass article, in particular out of the surface of the glass article, into the exchange bath. As already described, this ion exchange results in the buildup of a compressive stress zone in the surface region of the glass article.

The maximum tensile stress is understood in the context of the present disclosure to mean the minimum stress value in the stress profile of a glass article.

A so-called "sharp impact" is understood in the context of the present disclosure to mean a load for which the damage is produced by a small sharp object or by a large number of such small sharp objects. In other words, what is involved is therefore an impact with one sharp object or a plurality of sharp objects, that is, for example, with particles that have very small radii of curvature or for which the angle of the tip of the particle is less than 100°.

Insofar as, in the context of the present disclosure, reference is made to the grit of an abrasive paper, this grit is given taking into account and is preferably in accordance with DIN ISO 6344. This grit is oriented to mesh as a unit of measurement. The larger the grit is, the smaller thereby are the abrasive particles. In the context of the present disclosure, the terms "grit 60" and "#60"—here, for example, in relation to a so-called grit of 60—are used synonymously in referring to the grit. This obviously applies in a corresponding way to other grits, such as, for example, a 100 or 180 grit.

Surprisingly, it has been found for the chemically prestressed, plate-shaped glass article in accordance with the present disclosure that, evidently, the exchange depth, in particular the sodium exchange depth, is a governing factor in regard to the wear resistance. Surprisingly, therefore, the potassium exchange, in spite of the very high compressive prestress at the surface that can thereby be achieved, has only little influence for the set-drop strength being regarded. In particular, it is possible to achieve the very good set-drop strengths of the glass article in accordance with the present disclosure also in the case of a pure sodium exchange.

The underlying mechanism here is not conclusively understood.

However, it is assumed that a large exchange depth, possibly also during penetration of larger sharp particles, such as those contained, for example, in a 60 grit of a commercially available sandpaper, is still deep enough in order to prevent the sharp particle from being able to advance into the core of the glass article, which is present under tensile stress.

In order to advantageously achieve an exchange depth that is as large as possible, a glass can be used that has the following properties:

A high mobility of ions, in particular of alkali ions, and/or A rigid network, that is, a stiff network, which offers resistance to a deformation.

Such a glass can be obtained, for example, by way of a glass having a composition comprising a high content of network formers. In this way, it is possible to obtain a stiff, rigid network, which then offers resistance to a deformation and hence can correspondingly store an introduced compressive stress. It may also be advantageous if the content of such network modifiers having a low field strength is limited, since it is known that such network modifiers tend to weaken the network structure.

Alternatively or additionally, it may be advantageous if the glass exhibits a high mobility of ions, in particular of alkali ions, since, in this case, the alkali ions can readily be exchanged and this should lead to a correspondingly high exchange depth.

It can also be quite especially advantageous when the glass exhibits both a high mobility of ions, in particular of alkali ions, and, at the same time, a rigid, stiff glass network, since, in this case, it is possible not only for the ions to be readily exchanged, but, per exchanged ion, it should then also correspondingly be possible for a large stress to be stored or to be storable in the glass network and thus also in the glass or in the resulting glass article.

In the context of the present disclosure, the term field strength of an ion is used in accordance with Dietzel. In particular, this term is used in relation to an oxidic glass matrix, with it being understood that this value can change depending on the coordination number of the ion in question.

In regard to the terms network modifier and network former, these terms are understood in accordance with Zachariasen.

In the context of the present disclosure, network formers here refer, in particular, to $SiO_2$, $Al_2O_3$, $B_2O_3$, and $P_2O_5$.

Network modifiers refer, in particular, to alkali oxides and alkaline earth oxides.

In particular, $ZrO_2$ is referred to as a so-called intermediate oxide.

An especially rigid, solid network has, for example, quartz glass, that is, amorphous $SiO_2$. Moreover, quartz glass $SiO_2$ also has a number of advantageous properties, although it is not economically amenable to a melting process followed by hot forming due to the extremely high melting temperatures of pure quartz glass. A plate-shaped glass article made of pure quartz glass is therefore not possible to create in an economical way, in particular not in the sizes that are relevant for the application as a protective glass for mobile devices. Nor is a prestressing by way of an ion exchange possible with such a glass, because it does not comprise any significant proportions of alkali ions beyond mere traces.

It has been found that an adequately stiff, rigid glass network is obtained for a minimum content of network formers of at least 82 wt %. Preferably, the sum total of the content of $Al_2O_3$ and $SiO_2$ in the glass and/or in the glass article should not exceed 92 wt %, preferably 90 wt %. Especially preferred, the total content of network formers in the glass should not be more than 92 wt %, most especially preferred not more than 90 wt %.

Alternatively or additionally, it is possible to obtain a chemically prestressed, plate-shaped glass article in accordance with the present disclosure by limiting the content of alkali oxides to at most 12 wt %, preferably at most 10 wt %.

Namely, a glass network is more rigid, the fewer non-bridging oxygens it has. Through the addition of alkali oxides to the network formers, such as, for example, $SiO_2$ and/or $Al_2O_3$, however, non-bridging oxygens are created. The inventors have found that a good prestressability can evidently be produced when the content of alkali oxides is limited as much as possible.

This is surprising, in particular, because the alkali ions are the very constituents of the glass that are exchanged in an ion exchange. It was hitherto assumed, therefore, that a prestressing that is as high as possible can be achieved when a content of exchangeable ions that is as high as possible is present in the glass network.

Especially for the example in question here, namely, the so-called set-drop strength, the exchangeability of the alkali ions seems to be less especially decisive, but instead the physical property of the glass network of being stiff and rigid relative to deformations seems to be effective.

A further aspect of the present disclosure relates to a chemically prestressed, plate-shaped glass article with a composition comprising the components $SiO_2$, $Al_2O_3$, and $Li_2O$, in particular a glass article in accordance with the first aspect of the present disclosure, which is obtained in an ion exchange of a lithium alumosilicate glass, wherein an ion exchange in an exchange bath comprising between at least 20 wt % and up to 100 wt % of a sodium salt, preferably sodium nitrate $NaNO_3$, is carried out for a period of time of at least 2 hours, preferably at least 4 hours, and at most 24 hours at a temperature that lies between at least 380° C. and at most 440° C., whereby, optionally, a potassium salt, in particular potassium nitrate, can be added to the exchange bath, in particular such that the sum of the content of sodium salt and potassium salt adds up to 100 wt %, as well as, optionally, a second ion exchange in an exchange bath comprising between 0 wt % and 10 wt % of a sodium salt, preferably sodium nitrate $NaNO_3$, in relation to the total amount of the salt, for a period of time of at least one hour and at most 6 hours at a temperature of the exchange bath of at least 380° C. and at most 440° C., whereby a potassium salt is added to the exchange bath, in particular preferably potassium nitrate $KNO_3$, especially such that the sum of the content of sodium salt and potassium salt adds up to 100 wt %.

It is additionally possible that still further ions exchange steps are carried out.

The prestressing method should, in general, comprise at least one step, preferably two steps, more rarely three or even four steps of an ion exchange. These steps can be carried out with mixed salts, that is, salts comprising a sodium salt and a potassium salt, preferably sodium nitrate $NaNO_3$ and potassium nitrate $KNO_3$, or else with only one salt, such as, for example, only sodium nitrate $NaNO_3$ or potassium nitrate $KNO_3$. As a rule, in terms of percent, in this case, the first step comprises more sodium salt than the second step and, in general, the first step is also longer in terms of time than the second step.

In a first exchange step, the exchange bath comprises, for example, between 20 wt % and up to 100 wt % sodium salt in relation to the total amount of the salt. In this case, the first step is carried out for a time of between, for example, at least 2 hours, preferably at least 4 hours, and at most 24 hours, where the temperature of the exchange bath can vary between 380° C. and 440° C.

In a second exchange step, the exchange bath comprises, for example, between 0 wt % and 10 wt % sodium salt in relation to the total amount of the salt. The second step can last between at least one hour and at most 6 hours. Here, too, the temperature of the exchange bath can vary between at least 380° C. and at most 440° C.

When a prestressed glass article is produced as discussed above, it is possible in an especially rapid way to produce a glass article that has a high strength.

In accordance with a third aspect of the present disclosure, the present disclosure relates to a chemically prestressed, plate-shaped glass article with a composition comprising the components $SiO_2$, $Al_2O_3$, and $Li_2O$, preferably in accordance with the first and/or the second aspect of the present disclosure, with a composition comprising the following components in wt %.

$SiO_2$ 57 to 69, preferably 59 to 69, especially preferred 61 to 69, where the upper limit in each case can be preferably 67,
$Al_2O_3$ 17 to 25, preferably 17 to 21,
$B_2O_3$ 0 to 7, preferably 0 to 5, especially preferred 0 to 4.5,
$Li_2O$ 3 to 5.5, preferably 3.5 to 5.5,
$Na_2O$ 0.8 to 7, preferably 0.8 to 6, especially preferred 0.8 to 5.5,
where preferably the sum total of the content of $Al_2O_3$ and $SiO_2$, in relation to the given value in wt %, lies between at least 75 and at most 92, preferably at most 90.

It was already discussed that the $SiO_2$ as pure quartz glass forms an especially stiff network. Therefore, the content of $SiO_2$ in a glass article in accordance with the present disclosure should be at least 57 wt %. A high content of $SiO_2$ is also favorable for a chemical resistance that is as high as possible. The content of $SiO_2$ may also not be too low, because, otherwise, devitrification might possibly occur. Preferably, the content of $SiO_2$ in accordance with the presently disclosed embodiments is at least 59 wt %, especially preferred at least 61 wt %. However, the content of $SiO_2$ is limited in the present case, because, otherwise, a melting temperature that is too high might be present. Preferably, therefore, the content of $SiO_2$ should be at most 69 wt %. Preferably, the upper limit for the $SiO_2$ content in accordance with one embodiment with the otherwise further presently disclosed constituents of the composition is 67 wt %.

$Al_2O_3$ is a known network former, which, in particular, is added to alkali-containing silicate glasses, since, through the addition of $Al_2O_3$, the number of non-bridging oxygens is reduced, so that, in spite of a certain content in a glass, a stiff network can be obtained. In this way, it is also possible to improve the prestressability of an alkali-containing silicate glass. Advantageously, therefore, the minimum content of $Al_2O_3$ in the glass is 17 wt % in accordance with one embodiment with the otherwise further presently disclosed constituents of the composition. However, too high a content of $Al_2O_3$ reduces the chemical resistance of the resulting glass or glass article, in particular the resistance to acids. Preferably, therefore, the content in the glass or in the glass article in accordance with further embodiments with the otherwise further presently disclosed constituents of the composition is limited and is preferably at most 25 wt %, especially preferred at most 21 wt %.

The glass in accordance with the present disclosure—or in a corresponding way, the glass article in accordance with the present disclosure—also comprises $Li_2O$ as a component. $Li_2O$ is a requisite constituent of the glass or of the glass article in accordance with the present disclosure, because, in this way, a sodium exchange, that is, an exchange of lithium ions out of the glass for sodium ions out of the exchange bath is possible. As discussed in regard to the glass article in accordance with the first aspect of the present disclosure, an especially high sodium exchange depth can be a decisive feature of a glass article in accordance with the present disclosure. Therefore, the lithium content should be, if possible, at least 3 wt %, preferably at least 3.5 wt %. However, it is advantageous when the $Li_2O$ content is not too high, since, furthermore, $Li_2O$ is also a glass component that, as is known, leads to or can lead to a demixing and/or a crystallization of a glass. Advantageously, therefore, the content in the glass or in the plate-shaped glass article is at most 5.5 wt %.

$B_2O_3$ is a merely optional component of a glass article in accordance with embodiments with the otherwise further presently disclosed constituents of the composition of the present disclosure. $B_2O_3$ is a known network former and improves, in particular, the meltability of a glass, because it lowers the melting point. $B_2O_3$ is also advantageous because it increases the scratch resistance of a glass. Therefore, a certain percentage of $B_2O_3$ can be advantageous, since a scratch, like the so-called set drop, is likewise a load that is placed on an article or product with a sharp object. Advantageously, however, the content of $B_2O_3$ is limited and, in accordance with embodiments with the otherwise further presently disclosed constituents of the composition, should be at most 7 wt %, preferably at most 5 wt %, and especially preferred at most 4.5 wt %.

$Na_2O$ is a further constituent of the glass or of the glass article in accordance with one embodiment with the otherwise further presently disclosed constituents of the composition. Sodium ions can be exchanged for potassium ions in an ion exchange in accordance with these embodiments of the present disclosure. Therefore, in order to achieve a surface compressive prestress that is as high as possible resulting from the potassium exchange, the glass or the glass article in accordance with embodiments with the otherwise further presently disclosed constituents of the composition comprises at least 0.8 wt % $Na_2O$. However, the sodium oxide content of the glass article or of the glass in accordance with the present disclosure is preferably limited and is no more than 7 wt %, especially preferred no more than 6 wt %, and most especially preferred no more than 5.5 wt %. This is because a high content of sodium oxide leads, for example, to a reduction in the chemical resistance of the glass or of the glass article, in particular the resistance to acids.

$P_2O_5$ is a further, optional component of the glass and/or of the glass article in accordance with embodiments with the otherwise further presently disclosed constituents of the composition. A content of $P_2O_5$ in the glass and/or in the glass article can be advantageous, since, as a glass component, $P_2O_5$ can bring about the achievement of a deeper prestressing in a shorter time. $P_2O_5$ can also be advantageous, since, in this way, the exchange process can be accelerated. However, a high content of $P_2O_5$ in the glass is unfavorable, since $P_2O_5$ can attack the material of the melting apparatus. The content of the glass and/or of the glass article in accordance with embodiments should therefore be at most 3 wt %. Preferably the content of $P_2O_5$ in the glass and/or in the glass article amounts to no more than 2 wt %, especially preferred no more than 1.7 wt %.

Preferably, the sum total of the content of $Al_2O_3$ and $SiO_2$, in relation to the given value in wt %, lies between at least 75 and at most 92, preferably at most 90.

A content of the network formers $Al_2O_3$ and $SiO_2$ of at least 75 wt % is advantageous, in particular, because, in this way, an adequate quantity of glass formers is present. In other words, it is ensured in this way that a glassy material is obtained and no crystallization occurs. On the other hand, the content of the aforementioned network formers should not be too high, since, otherwise, the resulting glass can no longer be readily melted. Therefore, the content of $Al_2O_3$ and $SiO_2$ is preferably limited and is no more than 92 wt %, preferably no more than 90 wt %. Preferably, the total content of network formers in the glass or in the glass article is no more than 92 wt %, especially preferred no more than 90 wt %.

In accordance with a further embodiment, the thickness of the glass article is at least 0.4 mm and at most 3 mm.

Preferably, the thickness of the glass article is at least 0.5 mm.

The thickness of the glass article is preferably limited, furthermore, and, in accordance with one embodiment, is at most 2 mm, preferably at most 1 mm.

The present disclosure further relates to the use of a glass article in accordance with embodiments as a cover panel, in particular as a cover panel for devices in consumer electronics, in particular for display devices, monitors for computing devices, measurement devices, TV-devices, in particular as cover panel for mobile devices, in particular for at least one devices of the group comprising: mobile terminals, mobile data processing devices, such as mobile phones, mobile computers, palm tops, laptops, tablet computers, wearables, portable watches and time measuring devices, or as protective glazing, in particular as protective glazing for machines, or as glazing in high-speed trains or as safety glass or as automobile glazing or, in diver's watches, or in submarines or also as a cover panel for explosion-proof devices, in particular for those in which the utilization of glass is compulsory.

A further aspect of the present disclosure relates to a lithium aluminum silicate glass comprising the following components in wt %:

$SiO_2$ 57 to 69, preferably 59 to 69, especially preferred 61 to 69, where the upper limit in each case can be preferably 67, $Al_2O_3$ 17 to 25, preferably 17 to 21, $B_2O_3$ 0 to 7, preferably 0 to 5, especially preferred 0 to 4.5, $Li_2O$ 3 to 5.5, preferably 3.5 to 5.5, $Na_2O$ 0.8 to 7, preferably 0.8 to 6, especially preferred 0.8 to 5.5, where preferably the sum total of the content of $Al_2O_3$ and $SiO_2$, in relation to the given value in wt %, lies between at least 75 and at most 92, preferably at most 90.

Such a glass is advantageous, because it is designed to be chemically prestressed in such a way that chemically prestressed glass articles with especially high strength in the so-called set-drop test are obtained, even when coarse grits, such as, for example, 60 grits are used. The glass in accordance with the present disclosure is also surprisingly readily meltable in spite of a high content of glass formers—here, in particular, preferably a high content of the glass formers $SiO_2$ and $Al_2O_3$ of at least 75 wt %—so that the addition of $B_2O_3$, a component that is known to increase the meltability, is not absolutely essential. Surprisingly, it has been found that the addition of $B_2O_3$, although it increases the scratch resistance of a glass or of a glass article, is not absolutely essential for achieving a high set-drop strength and, in contrast, can surprisingly even be detrimental, even though the set-drop strength, like the scratch resistance, is also a load with a sharp object that is placed on the surface of an article or product.

In the opinion of the inventors, this is possibly due to the fact that a glass having the composition in the above-mentioned limits is designed to be prestressable in such a way that an especially high exchange depth, in particular an especially high exchange depth for the sodium exchange (that is, the exchange of sodium ions out of a sodium salt melt for lithium ions out of the glass), is decisive for the creation of a good set-drop strength and, surprisingly, less so for the resistance of the surface toward scratching or the penetration of a sharp object.

In spite of a relatively small amount of $Li_2O$ in the glasses in accordance with the present disclosure, an adequate prestressability is still afforded. This is all the more surprising in that the percentage of $Li_2O$ in the glasses in accordance with embodiments with the otherwise further presently disclosed constituents of the composition is markedly limited and is no more than 5.5 wt %. It is also known that the $Li^+$ ion has a greater field strength than does, for example, the $Na^+$ ion and therefore is bound more strongly in a glass network than the latter. Nonetheless, evidently an adequate mobility of the $Li^+$ ion in the glass is provided in accordance with the embodiments of the present disclosure. It seems that especially the combination of the components of the glass in accordance with the present disclosure, in particular the ratio of the three main components lithium oxide, aluminum oxide, and silicon oxide to one another, leads to the fact that an adequate mobility of the lithium ion in the glass network is given. The glass network here is apparently still rigid enough to allow for an efficient prestressing in spite of a certain content of sodium oxide, which, for example, also makes possible an optional potassium exchange—which, however, is not absolutely required in the present case—and, furthermore, is also a known component that improves the meltability of a glass. However, it has been found that, as a component in a glass network, sodium oxide can have a negative effect on the prestressability, because, due to the sodium oxide, the number of the non-bridging oxygens is increased, as a result of which the network is less stiff and rigid. However, it seems that this is compensated for by the interplay of the individual components, so that, with the glass in accordance with the present disclosure, it is possible to achieve a very good compromise between the set-drop strength, the meltability, and the prestressability.

In accordance with one embodiment of the lithium aluminum silicate glass, this is given by the following composition in wt %:

$SiO_2$ 57 to 69, preferably 59 to 69, especially preferred 61 to 69, where the upper limit in each case can be preferably 67, $Al_2O_3$ 17 to 25, preferably 17 to 21, $B_2O_3$ 0 to 7, preferably 0 to 5, especially preferred 0 to 4.5, $Li_2O$ 3 to 5.5, preferably 3.5 to 5.5, $Na_2O$ 0.8 to 7, preferably 0.8 to 6, especially preferred 0.8 to 5.5, $K_2O$ 0 to 1, preferably 0 to 0.8, especially preferred 0 to 0.7, $MgO$ 0 to 2, preferably 0 to 1.5, especially preferred 0 to 1, CaO 0 to 4.5,
SrO 0 to 2, preferably 0 to 1.5, especially preferred 0 to 1,
ZnO 0 to 3, preferably 0 to 2, especially preferred 0 to 1.5,
$P_2O_5$ 0 to 3, preferably 0 to 2, especially preferred 0 to 1.7,
$ZrO_2$ 0 to 3, preferably 0 to 2,
where, in addition, contaminants and/or refining agents and/or coloring agents can be present in amounts up to 2 wt %.

Again, another aspect of the present disclosure relates to a method for producing a glass article, preferably a glass article in accordance with the embodiments presently disclosed, comprising the steps: an ion exchange in an exchange bath comprising between at least 20 wt % and up to 100 wt % of a sodium salt, preferably sodium nitrate $NaNO_3$, is carried out for a period of time of at least 2 hours, preferably at least 4 hours, and at most 24 hours at a temperature that lies between at least 380° C. and at most 440° C., whereby, optionally, a potassium salt, in particular potassium nitrate, can be added to the exchange bath, in particular such that the sum of the content of sodium salt and potassium salt adds up to 100%, as well as, optionally, a second ion exchange in an exchange bath comprising between 0 wt % and 10 wt % of a sodium salt, preferably sodium nitrate $NaNO_3$, in relation to the total amount of the salt, for a period of time of at least one hour and at most 6 hours at a temperature of the exchange bath of at least 380° C. and at most 440° C., whereby a potassium salt is added to the exchange bath, in particular preferably potassium nitrate $KNO_3$, in particular such that the sum of the content of sodium salt and potassium salt adds up to 100 wt %, as well as, optionally, one further exchange step or a plurality of further exchange steps.

EXAMPLES

An exemplary range of composition of a glass and/or a glass article is given by the following composition in wt %:
$SiO_2$ 57 to 69, preferably 59 to 69, especially preferred 61 to 69, where the upper limit in each case can be preferably 67,
$Al_2O_3$ 17 to 25, preferably 17 to 21,
$B_2O_3$ 0 to 7, preferably 0 to 5, especially preferred 0 to 4.5,
$Li_2O$ 3 to 5.5, preferably 3.5 to 5.5,
$Na_2O$ 0.8 to 7, preferably 0.8 to 6, especially preferred 0.8 to 5.5,
K2O 0 to 1, preferably 0 to 0.8, especially preferred 0 to 0.7,
MgO 0 to 2, preferably 0 to 1.5, especially preferred 0 to 1,
CaO 0 to 4.5,
SrO 0 to 2, preferably 0 to 1.5, especially preferred 0 to 1,
ZnO 0 to 3, preferably 0 to 2, especially preferred 0 to 1.5,
$P_2O_5$ 0 to 3, preferably 0 to 2, especially preferred 0 to 1.7,
$ZrO_2$ 0 to 3, preferably 0 to 2,
where, furthermore, contaminants and/or refining agents and/or coloring constituents can be present in amounts of up to 2 wt %.

A exemplary composition of a glass from which a plate-shaped glass article in accordance with one embodiment can be produced and/or of a glass article in accordance with one embodiment can be produced is given by the following composition in wt %:
$SiO_2$ 57 to 69, preferably 59 to 69, especially preferred 61 to 69, where the upper limit in each case can be preferably 67,
$Al_2O_3$ 17 to 25, preferably 17 to 21,
$B_2O_3$ 0 to 7, preferably 0 to 5, especially preferred 0 to 4.5,
$Li_2O$ 3 to 5.5, preferably 3.5 to 5.5,
$Na_2O$ 0.8 to 7, preferably 0.8 to 6, especially preferred 0.8 to 5.5,
where preferably the sum total of the content of $Al_2O_3$ and $SiO_2$, in relation to the given value in wt %, lies between at least 75 and at most 92, preferably at most 90.

FIG. 1 shows the relation between the stored tensile stress and the results relating to the set-drop strength for use of a sandpaper of grit #60. It is revealed here that this set-drop strength, which is given as the mean value of drop height in centimeters for 15 samples, in contrast to that represented, for example, in the applicant's own application with the number DE 10 2018 124 785, increases with increasing, stored tensile stress (which is abbreviated in the context of the present disclosure as TS/d, where "TS" stands for "tensile stress" and "d" stand for the thickness of the glass article, where the unit of the stored tensile stress is MPa).

However, this does not hold true absolutely, but only when the object with a small radius of curvature does not penetrate through the DoL. Instead, it has been found that the described relation between the stored tensile stress and the set-drop strength is linked to the condition of a minimum DoL. As also already discussed further above, this is motivated by the different grits of respective sandpapers. FIG. 2 is an Illustration of this, in which the minimum DoL for a glass of a certain composition in accordance with one embodiment of the present disclosure or for a glass article in accordance with embodiments of the present disclosure has been plotted. The finer the grit (that is, with increasing number of grains per unit area and thus toward higher # values), the smaller, in principle, is this minimum DoL. It was already pointed out that, in particular, rough and acute-angled surfaces are especially hazardous for protective glasses or cover glasses. Acute-angled penetrating hits or the stress field produced by them, depending on the size thereof, are capable of penetrating through the DoL and advancing into the zone of tensile stress and hence of causing a glass fracture. In this respect, the minimally requisite DoL beyond which the relation between a larger stored tensile stress and a higher set-drop strength holds true increases with the grit of the sandpaper used in the set-drop test. The larger the acute-angled grain or the stone, the greater is this minimum DoL. In an especially impressive manner, AS glasses with a simple ion exchange profile demonstrate this relation. Thus, in a standard prestress protocol for which a DoL of 50 μm and a compressive prestress of 926 MPa are achieved, these have a stored tensile stress of 33.07 MPa for the thickness 0.7 mm. Based on the small DoL, however, this stored tensile stress is not reflected in a good #60 set-drop strength and the glasses already fail at minimum heights of 25 cm.

Figure 3A:
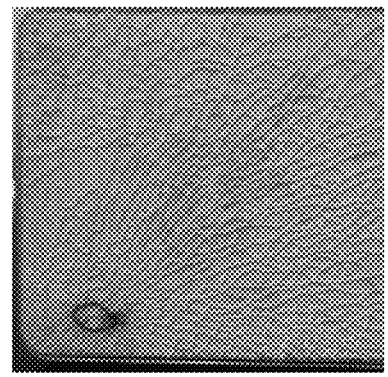
Figure 3B:
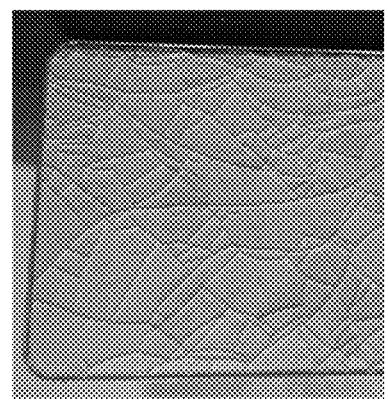
Figure 3C:

FIGS. 3a-3c shows fracture patterns of set-drop tests using #60 for glass articles comprising a LAS glass having a first composition in accordance with one embodiment of this disclosure. In FIG. 3a, the glass article has a storable tensile stress of −23.84 MPa, in FIG. 3b the stress of −21.97 MPa, and in FIG. 3c the stress of −19.61 MPa. It is thus shown that the fracture pattern is finer, the higher the stored tensile stress is in the glass article.

Figure 4A:
Figure 4B:
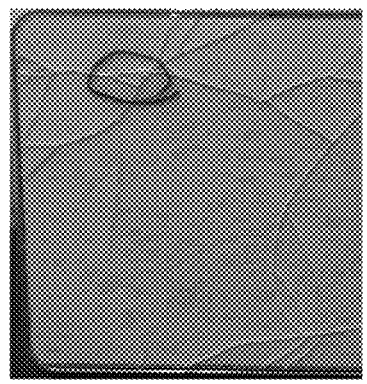
Figure 4C:
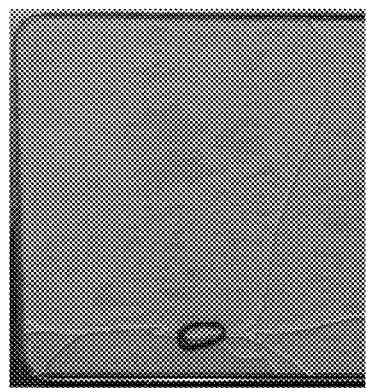

This can also be further substantiated on the basis of the photographic images of FIGS. 4a-4c. Here, fracture patterns from set-drop tests using #60 for glass articles comprising a LAS glass having a second composition in accordance with one embodiment of this disclosure are depicted. In FIG. 4a, the storable tensile stress is −19.02 MPa, in FIG. 4b the stress is −15.38 MPa, and in FIG. 4c the stress is only −12.36 MPa.

FIG. 5 is the schematic and not dimensionally accurate illustration of a plate-shaped glass article in accordance with embodiments of this disclosure.

FIG. 6 shows a schematic and not dimensionally accurate sectional drawing of a glass article 1 in accordance with embodiments of this disclosure. In this case, the glass article 1 has two zones 101 that are under compressive stress and are referred to as compressive stress zones. These compressive stress zones 101 have the dimension "DoL," which is also drawn schematically in FIG. 6. It is possible that the DoL on the two sides of the plate-shaped glass article differ in terms of their size, where, however, these differences lie, as a rule, within the limits of measurement accuracy, so that the DoL for a plate-shaped glass article 1, as a rule, is the same on both sides—at least within the limits of measuring accuracy.

Lying between the compressive stress zones 101 is the region 102, which is under tensile stress.

In FIG. 7, in a diagram in which the stress in MPa is plotted on the y-axis and the glass depth in μm is plotted on the x-axis, characterizing values of a stress profile for a glass article that comprises a LAS glass are depicted on the basis of an exemplary combined stress profile 2 of an exemplary glass article. The stress is not depicted here over the entire thickness of the glass article, but rather is plotted, by way of example, only over about half of the glass article.

In this case, the point 201 indicates the stress that is at the surface of the glass article, that is, in each case, at a glass depth of 0 μm. What is involved here is a compressive stress that is caused essentially by the exchange of potassium ions (potassium CS). The point 202 in FIG. 7 indicates the compressive stress (also referred to as sodium CS) at the surface of the glass article caused by the exchange of sodium. What is involved here is a value determined by extrapolation, because here the stress profile that is due to the exchange of sodium ions overlaps with the stress profile that is based on the exchange of potassium. The point 203 shows, in a highly schematic manner, the value of the compressive stress, based on the exchange of sodium ions, at a glass depth of 30 μm (sodium CS-30). At the point 205, the stress in the glass article is 0. What is involved here is the so-called depth of compressive stress for sodium ions, which is also referred as the sodium DoL (or also as just the DoL). The point 204 indicates the compressive stress integral brought about by the exchange of sodium ions.

Obtained by extrapolation of that part of the stress profile 2 is the depth of compressive stress for potassium (potassium DoL), here indicated by 206.

Finally, 207 marks the region of the normalized tensile stress integral, that is, the tensile stress stored in the glass article.

The "potassium DoL point of intersection" is understood to mean the depth in the glass article at the point in the compressive stress profile at which the sodium compressive stress curve and the potassium compressive stress curve intersect. In FIG. 7, this point is marked with the reference number 208.

LIST OF REFERENCE NUMBERS 1 plate-shaped glass article
101 compressive stress zone
102 inner region of the glass article that is under stress
2 exemplary stress profile of a prestressed LAS glass article
201 compressive stress produced at the surface of the glass article, essentially the potassium CS
202 sodium CS
203 compressive stress based on the exchange of sodium ions at a glass depth of 30 μm
204 sodium compressive stress integral
205 sodium DoL, depth of compressive stress for sodium ions
206 depth of compressive stress for potassium ions, potassium DoL
207 stored tensile stress, normalized tensile stress integral
208 Na-CS-K DoL point of intersection

What is claimed is:

1. A chemically prestressed, plate-shaped glass article, comprising:
a glass with a composition comprising $SiO_2$, $Al_2O_3$, and $Li_2O$; and
a set-drop strength, given as drop height in cm, where the drop height is given as a mean value from 15 samples, from 50 to 150 with use of a grit of #60,
wherein the glass has at least one sodium exchange depth selected from a group consisting of:
a sodium exchange depth of at least 85 μm for a thicknesses of the glass article of at least 0.4 mm up to less than 0.55 mm,
a sodium exchange depth of at least 90 μm for a thicknesses of the glass article of at least 0.55 mm up to less than 0.6 mm,
a sodium exchange depth of at least 100 μm for a thicknesses of the glass article of at least 0.6 mm up to less than 0.7 mm,
a sodium exchange depth of at least 120 μm for a thicknesses of the glass article of at least 0.7 mm up to less than 1 mm, and
a sodium exchange depth of at least 170 μm for a thicknesses of the glass article of at least 1 mm up to 3 mm,
wherein the glass has a storable tensile stress of at most −15 MPa and at least −45 MPa, and
wherein the composition has a network former content of at least 82 wt %, a content of alkali oxides of at most 12 wt %, and 0 to at most 5 wt% $B_2O_3$.

2. The glass article of claim 1, wherein the composition comprises, in wt %:
$SiO_2$ 57 to 69,
$Al_2O_3$ 17 to 25,
$Li_2O$ 3 to 5.5,
$Na_2O$ 0.8 to 7, and
a sum total of a content of $Al_2O_3$ and $SiO_2$ between at least 75 and at most 92.

3. The glass article of claim 1, wherein the composition comprises, in wt %:
$SiO_2$ 57 to 69,
$Al_2O_3$ 17 to 25
$B_2O_3$ 0 to 7,
$Li_2O$ 3 to 5.5,
$Na_2O$ 0.8 to 7,
$K_2O$ 0 to 1,
$MgO$ 0 to 2,
$CaO$ 0 to 4.5,
$SrO$ 0 to 2,
$ZnO$ 0 to 3,
$P_2O_5$ 0 to 3,
$ZrO_2$ 0 to 3.

4. The glass article of claim 3, wherein the composition comprises contaminants and/or refining agents and/or coloring agents in amounts up to 2 wt %.

5. The glass article of claim 1, further comprising a thickness of at least 0.4 mm and at most 3 mm.

6. The glass article of claim 1, further comprising a thickness of at least 0.5 mm.

7. The glass article of claim 1, further comprising a thickness of at most 2 mm.

8. The glass article of claim 1, further comprising a thickness of at most 1 mm.

9. The glass article of claim 1, wherein the glass article is configured for a use selected from a group consisting of a cover panel, a cover panel for a consumer electronic device, a cover panel for a display device, a cover panel for a computer monitor, a cover panel for a measurement device, a cover panel for a television, a cover panel for a mobile device, a cover panel for a mobile terminal, a cover panel for a mobile data processing device, a cover panel for a mobile phone, a cover panel for a mobile computer, a cover panel for a palm top, a cover panel for a laptop, a cover panel for a tablet computer, a cover panel for a wearable device, a cover panel for a portable watch, a cover panel for a time measuring device, a protective glass for a machine, a glazing for a high-speed train, safety glass, an automobile glazing, a diving watch, a submarine, and a cover panel for an explosion-protected device.

10. The glass article of claim 2, wherein the composition comprises:
in wt %:
$B_2O_3$ 0 to 4.5.

11. The glass article of claim 2, wherein the composition comprises:
in wt %:
$K_2O$ 0 to 1.

12. The glass article of claim 1, wherein the sodium exchange depth is at least 115 μm for a thicknesses of the glass article of at least 0.4 mm up to less than 0.55 mm.

13. The glass article of claim 1, wherein the sodium exchange depth is at least 125 μm for a thicknesses of the glass article of at least 0.55 mm up to less than 0.6 mm.

14. The glass article of claim 1, wherein the sodium exchange depth is at least 135 μm for a thicknesses of the glass article of at least 0.6 mm up to less than 0.7 mm.

15. The glass article of claim 1, wherein the sodium exchange depth is at least 160 μm for a thicknesses of the glass article of at least 0.7 mm up to less than 1 mm.

* * * * *